(12) United States Patent
Smith

(10) Patent No.: US 6,517,026 B1
(45) Date of Patent: Feb. 11, 2003

(54) VERTICAL TAKE-OFF AND LANDING VEHICLE FOR LAND, WATER AND AIR TRANSPORT

(76) Inventor: Leo Smith, 114-56 142nd St., Jamaica, NY (US) 11436

( * ) Notice: Subject to any disclaimer, the term of this patent is extended or adjusted under 35 U.S.C. 154(b) by 0 days.

(21) Appl. No.: 09/948,024

(22) Filed: Sep. 6, 2001

(51) Int. Cl.[7] ............................................... B64C 37/02
(52) U.S. Cl. ........................... 244/2; 244/23 B; 244/50
(58) Field of Search ........................... 244/2, 12.1, 50, 244/73 R, 23 A, 23 B, 23 C

(56) References Cited

U.S. PATENT DOCUMENTS

| | | | | |
|---|---|---|---|---|
| 1,427,257 A | * | 8/1922 | Bowen et al. | 244/50 X |
| 2,444,332 A | * | 6/1948 | Briggs et al. | 244/2 X |
| 2,707,084 A | * | 4/1955 | Mills, Jr. | 244/50 X |
| 2,935,275 A | * | 5/1960 | Grayson | 244/23 C |
| 3,302,602 A | * | 2/1967 | Korganoff | 244/12.1 X |

* cited by examiner

Primary Examiner—Robert P. Swiatek
(74) Attorney, Agent, or Firm—Michael I Kroll

(57) ABSTRACT

The present invention relates to a vehicle for land and air transport and, more specifically, to a vertical take-off and landing vehicle for land, water and air transport which is submersible and utilizes compressed air to lift and propel said vehicle during travel. The land-based drive train and the aviatic air compression system are powered mechanically by the vehicle's engine or electrically by rechargeable battery banks and generators or a combination thereof thereby effectively reducing the present invention's reliance upon fossil fuel sources.

28 Claims, 10 Drawing Sheets

```
┌─────────────────────────────────────────────────────────┐
│ OPERATOR ACTIVATES HYDRAULIC PUMP JACKS WHICH           │
│ RAISES VEHICLE UNTIL THE WHEELS ARE OFF                 │
│ OF THE GROUND.                                          │
└─────────────────────────────────────────────────────────┘
                            │
┌─────────────────────────────────────────────────────────┐
│ OPERATOR ACTIVATES RETRACTION MECHANISM                 │
└─────────────────────────────────────────────────────────┘
                            │
┌─────────────────────────────────────────────────────────┐
│ DRIVE SHAFT DISENGAGES FROM AXLE                        │
└─────────────────────────────────────────────────────────┘
                            │
┌─────────────────────────────────────────────────────────┐
│ WHEELS RETRACT HORIZONTALLY INTO UNDERCARRIAGE.         │
└─────────────────────────────────────────────────────────┘
                            │
┌─────────────────────────────────────────────────────────┐
│ WHEEL WELL COVERS MOVE INTO PLACE TO ENCLOSE            │
│ WHEEL AREA FOR IMPROVED AERODYNAMICS.                   │
└─────────────────────────────────────────────────────────┘
                            │
┌─────────────────────────────────────────────────────────┐
│ AILERONS ARE DEPLOYED AND EXTEND FROM WITHIN            │
│ THE VEHICLE'S BODY.                                     │
└─────────────────────────────────────────────────────────┘
                            │
┌─────────────────────────────────────────────────────────┐
│ VEHICLE IS READY FOR TAKE-OFF                           │
└─────────────────────────────────────────────────────────┘
```

FIG 8

VERTICAL TAKE-OFF AND LANDING VEHICLE FOR LAND, WATER AND AIR TRANSPORT

BACKGROUND OF THE INVENTION

1. Field of the Invention

The present invention relates generally to vehicles for land and air transport and, more specifically, to a vertical take-off and landing vehicle for land, water and air transport which is submersible and utilizes compressed air to lift and propel said vehicle during travel. The land-based drive train and the aviatic air compression system could be powered mechanically by the vehicle's engine or electrically by rechargeable battery banks and generators or a combination thereof thereby effectively reducing the present invention's reliance upon fossil fuel sources. Roads are more congested than ever and often don't have a direct route to a driver's destination resulting in unnecessary travel. These factors contribute to wasted time and fuel expenditure along with creating health hazards caused by the emissions of conventional automobiles. The present invention will provide drivers with an energy efficient vehicle on crowded roads and an alternate means for travel by air or on or below water directly to their destinations instead of taking roundabout roads thereby reducing pollutants that are released into the atmosphere and create health problems for humans and animals and which are also harmful to the environment. Recent advances in satellite navigational technology make piloting the present invention feasible for the general market. The present invention could also have many important applications for the military, emergency service workers and other agencies that might need to reach difficult to access areas in a timely manner.

2. Description of the Prior Art

There are numerous vehicles for land and air transport. While these vehicles for land and air transport may be suitable for the purposes for which they were designed, they would not be as suitable for the purposes of the present invention as heretofore described. It is thus desirable to provide a vertical take-off and landing vehicle for land, water and air transport utilizing mechanical and electrical power generation means to compress air that is then forced out of jet nozzles or propellers located on the vehicle's undercarriage to provide lift and nozzles or propellers on the vehicle's front and rear to provide propulsion. Navigational and stabilization aids such as radar, sonar, motion detection devices, gyroscopes, altimeters etc. work in conjunction with a microprocessor to assist the driver in safely maneuvering around potentially hazardous objects such as water towers and the like. Navigational lights including but not limited to strobe lights, beacons, and emitting diodes are located on the top, bottom, and all sides of the vehicle to increase its visibility during all modes of operation. The wheels retract for air and nautical transport and wheel well covers are deployed to hermetically seal the body of the present invention thereby optimizing the vehicle's hydrodynamic and aerodynamic properties. The cabin of the present invention is also airtight and is supplied with oxygen for life support when traveling at high altitudes and when submerged underwater. An air release valve is included to regulate the passage of air from within the cabin to its exterior in order to maintain proper air pressure therein as oxygen is being introduced into the pressurized environment. The electrical generator is powered by the drive shaft and provides an immediate recharge to the operating motor and/or the rechargeable batteries with the amount of recharge determined by the settings on resistors or potentiometers located on the line leading from the generator to the motor and also on the line leading from the generator to the rechargeable batteries.

SUMMARY OF THE PRESENT INVENTION

The present invention relates generally to vehicles for land, water and air transport and, more specifically, to a vehicle having vertical take-off and landing capabilities. The present invention is efficiently powered mechanically by an internal combustion engine and electrically by rechargeable battery banks that turn the disengagable drive shaft during land travel and compresses air which is ejected from jet nozzles that provide lift and thrust during water and air travel or it may rely on propellers that are part of the electrical system for movement.

A primary object of the present invention is to provide a vertical take-off and landing vehicle for land, water and air transport that will overcome the shortcomings of prior art devices.

Another object of the present invention is to provide a vertical take-off and landing vehicle for land, water and air transport that has rechargeable electrical battery banks that receive a charge from the vehicle's engine.

Still another object of the present invention is to provide a vertical take-off and landing vehicle for land and air transport wherein the charged electrical system could supply power to the drive shaft during land-and air operation without relying on fuel sources.

Yet another object of the present invention is to provide a vertical take-off and landing vehicle for land, water and air transport having hydraulic pump jacks located on the undercarriage near each wheel which could be operated singularly to change a tire or simultaneously to raise the entire vehicle off the ground for maintenance or to prepare the vehicle for retraction of the wheels when readying for take-off, and act as a cushion if the tires do not detract for landing.

A further object of the present invention is to provide a vertical take-off and landing vehicle for land, water and air transport wherein activation of the retraction mechanism disengages the axle from the drive shaft and hydraulically retracts the wheels into a horizontal position within the vehicle's undercarriage.

A still further object of the present invention is to provide a vertical take-off and landing vehicle for land, water and air transport wherein the retraction of the wheels causes wheel well covers to move into position and enclose and seal the entire wheel areas in order to increase the aerodynamic and hydrodynamic properties of the vehicle.

A yet further object of the present invention is to provide a vertical take-off and landing vehicle for land, water and air transport wherein activation of the retraction mechanism initiates deployment of collapsible ailerons from their stored position within the body of the vehicle.

Another object of the present invention is to provide a vertical take-off and landing vehicle for land, water and air transport having an air compressor with a tank that can preferably contain a minimum of 6,000 psi of compressed air with said compressor powered mechanically during land, water and air operation to compress and store air that will be necessary for lift-off and which could then be powered mechanically, electrically or a combination thereof once in flight. A pressure gauge in the cockpit informs the operator of the current psi status at all times.

Yet another object of the present invention is to provide a vertical take-off and landing vehicle for land, water and air transport having a plurality of jet nozzles connected to the air compression tank and located on the vehicle's underside to provide lift, on the rear for thrust, and possibly on the sides to enhance maneuverability or propellers as part of the electrical system for movement, and on the front to facilitate stopping and slowing down.

Still another object of the present invention is to provide a vertical take-off and landing vehicle for land and air transport having a microprocessor communicating with all on board systems.

A further object of the present invention is to provide a vertical take-off and landing vehicle for land and air transport wherein the microprocessor inputs data from a gyroscope and actuates the jet nozzles accordingly to maintain stability during flight.

A still further object of the present invention is to provide a vertical take-off and landing vehicle for land and air transport having navigational aids that could include but are not limited to radar, sonar, an altimeter, sensitivity adjustable motion sensors, etc.

A yet further object of the present invention is to provide a vertical take-off and landing vehicle for land, water and air transport wherein the microprocessor uses the data from said navigational aids to determine when impact with another object is imminent and responds by taking the appropriate evasive action.

Another object of the present invention is to provide a vertical take-off and landing vehicle for land, water and air transport having an emergency parachute with manual and automatic deployment means.

Yet another object of the present invention is to provide a vertical take-off and landing vehicle for land, water and air transport wherein the hydraulic pump jacks act as shock absorbers when landing.

Still another object of the present invention is to provide a vertical take-off and landing vehicle for land and air transport having a tempered glass bottom so as to provide a greater degree of visibility for the operator and passengers.

Yet still another object of the present invention is to provide a vertical take-off and landing vehicle for land, water and air transport having a solid rollover protection wall to reduce the injury incurred by the vehicle's occupants in the event of an errant landing.

One other object of the present invention is to provide a vertical take-off and landing vehicle for land, water and air transport having an airtight cabin with an oxygen supply to provide life support at high altitudes and underwater including a pressure release valve to insure proper pressure balance.

Yet another object of the present invention is to provide a vertical take-off and landing vehicle for land, water, and air transport having a sealed compartment attached to the undercarriage of the vehicle with an input nozzle allowing for the insertion of helium or some other bouyant substance with a gauge attached and/or inserted in the sealed compartment which reads the amount of the substance.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 8 is a block diagram depicting the action of the retraction mechanism preparing the vehicle to make the transition from land to water or air travel.

DESCRIPTION OF THE REFERENCED NUMERALS

Figure 1:
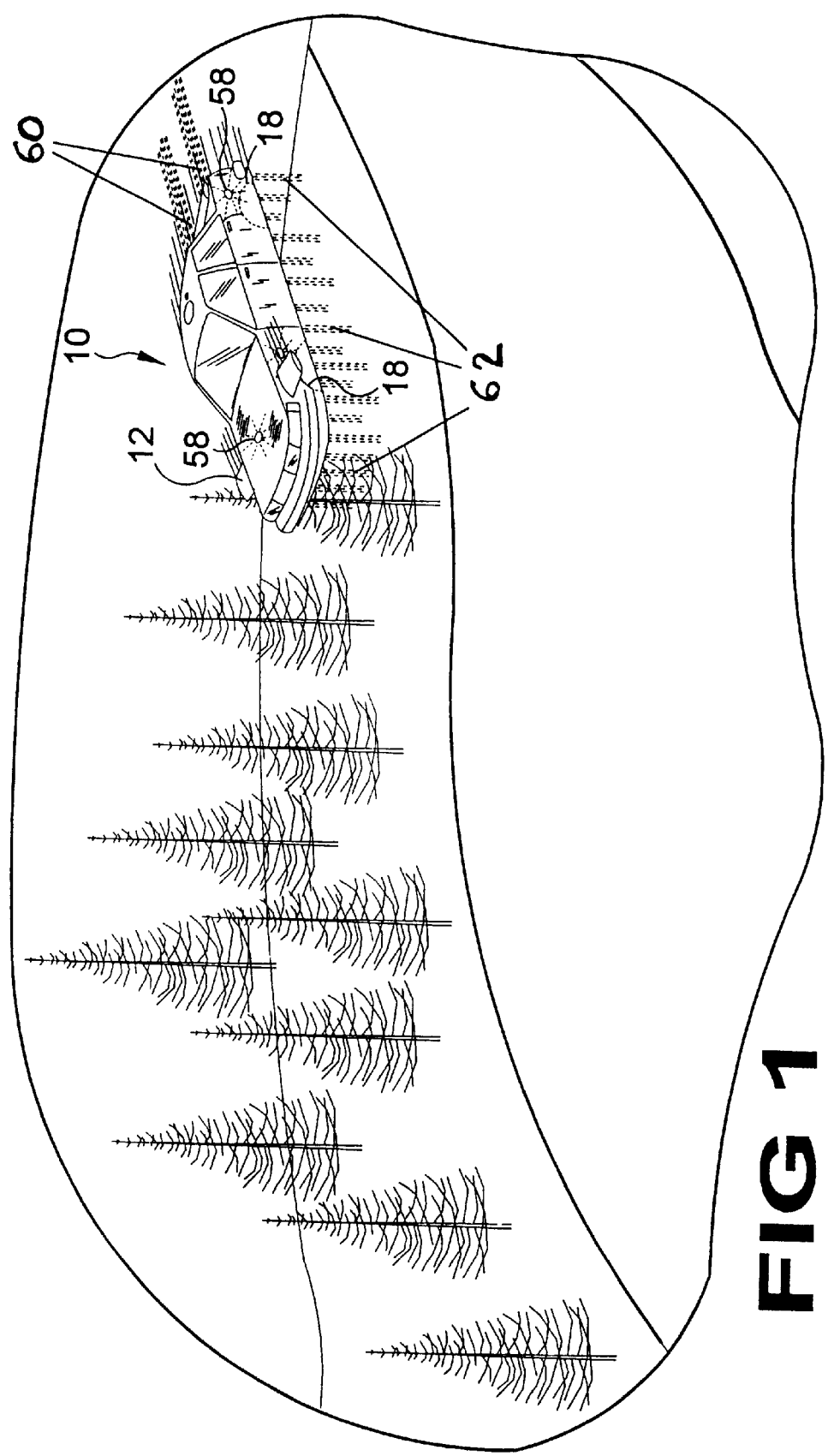
FIG. 1 is a perspective view of the present invention in flight; shown are the propulsion jet streams providing thrust to move the vehicle forward and backwards and the stabilizing jet streams that keep the vehicle aloft and level.
Figure 2:
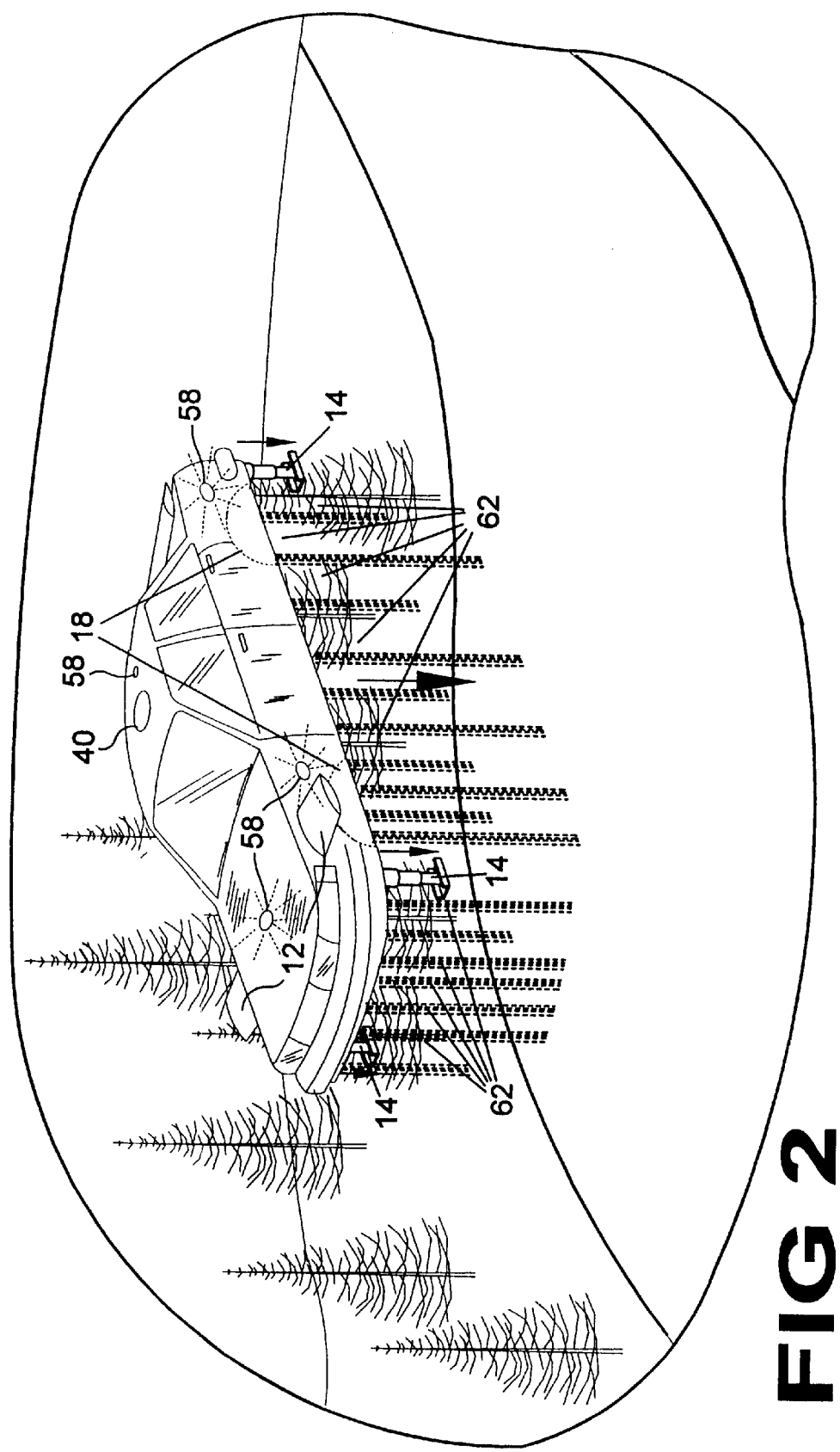
FIG. 2 is a perspective view of the present invention during landing with the pump jacks deployed to act as shock absorbers and landing gear or the deployment of the collapsible tires can do the same.
Figure 3:
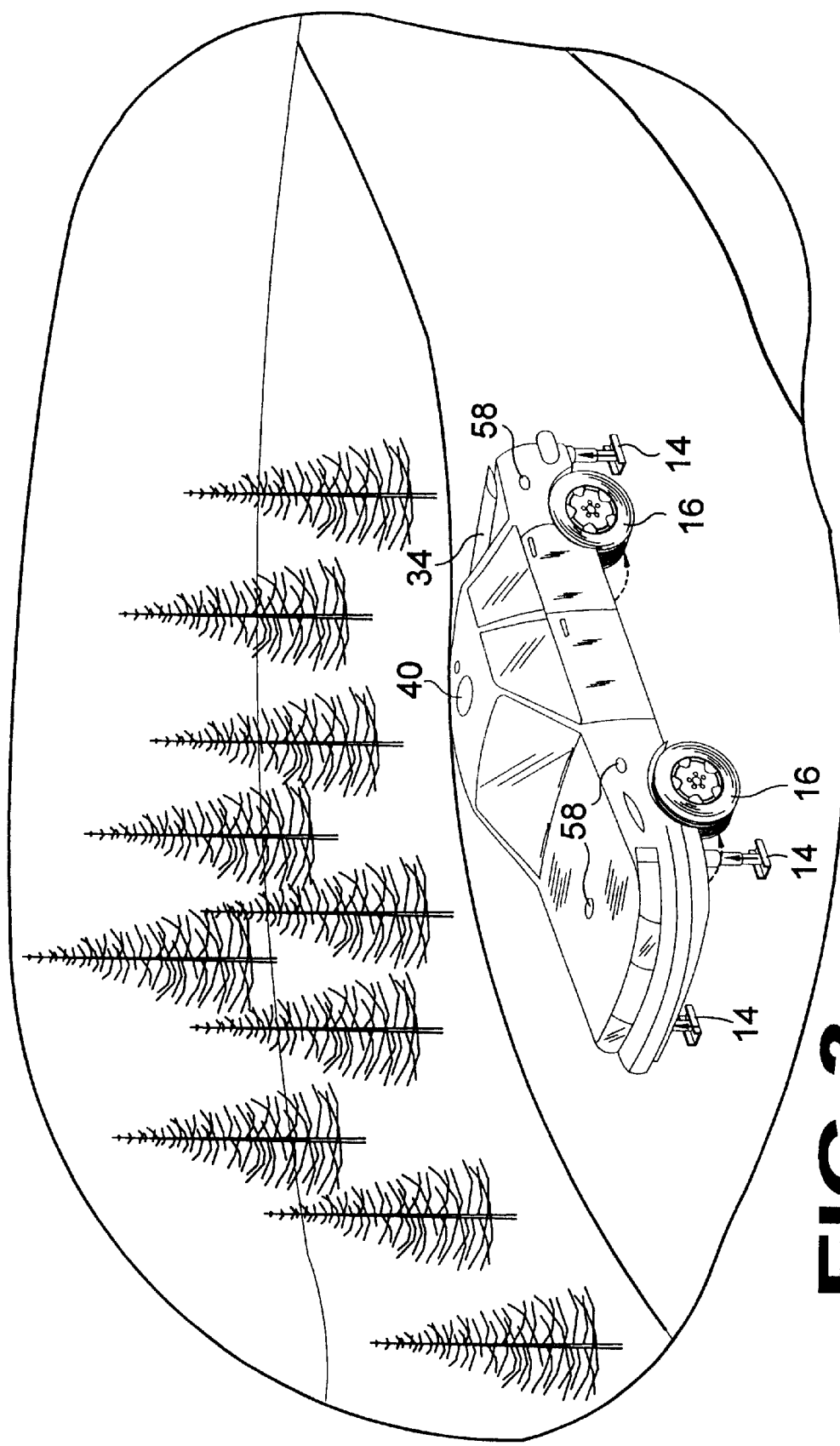
FIG. 3 is a perspective view of the present invention upon landing; shown are the wheel well covers retracted and the wheels have been deployed. Once the hydraulic pump jacks have been retracted the vehicle will be ready for land transport.

Turning now descriptively to the drawings, in which similar reference characters denote similar elements throughout the several views, the Figures illustrate the vertical take-off and landing vehicle for land, water, and air transport of the present invention. With regard to the reference numerals used, the following numbering is used throughout the various drawing figures.

10 vehicle of the present invention
12 ailerons
14 hydraulic pump jack
16 wheels
18 retractable wheel well covers
20 motor
22 air intake unit
24 air compression pump
26 air compression tank
28 propulsion jets
30 stabilizing jets
32 gyroscope 34 adjustable spoiler
36 oxygen unit
38 oxygen release valve
40 parachute
42 parachute ripcord
44 rechargeable battery
46 microprocessor
48 helium tank
50 helium pressure gauge
52 compressor pressure gauge
54 motion sensors
56 altimeter
58 navigation lights
60 propulsion jetstreams
62 stabilizing jetstreams
64 generator
66 rollover protection wall
68 climate control unit
70 potentiometer
72 boat

DETAILED DESCRIPTION OF THE PREFERRED EMBODIMENT

Turning now descriptively to the drawings, in which similar reference characters denote similar elements throughout the several views, FIGS. 1 through 9 illustrate the vehicle of the present invention indicated generally by the numeral 10.

Figure 4:
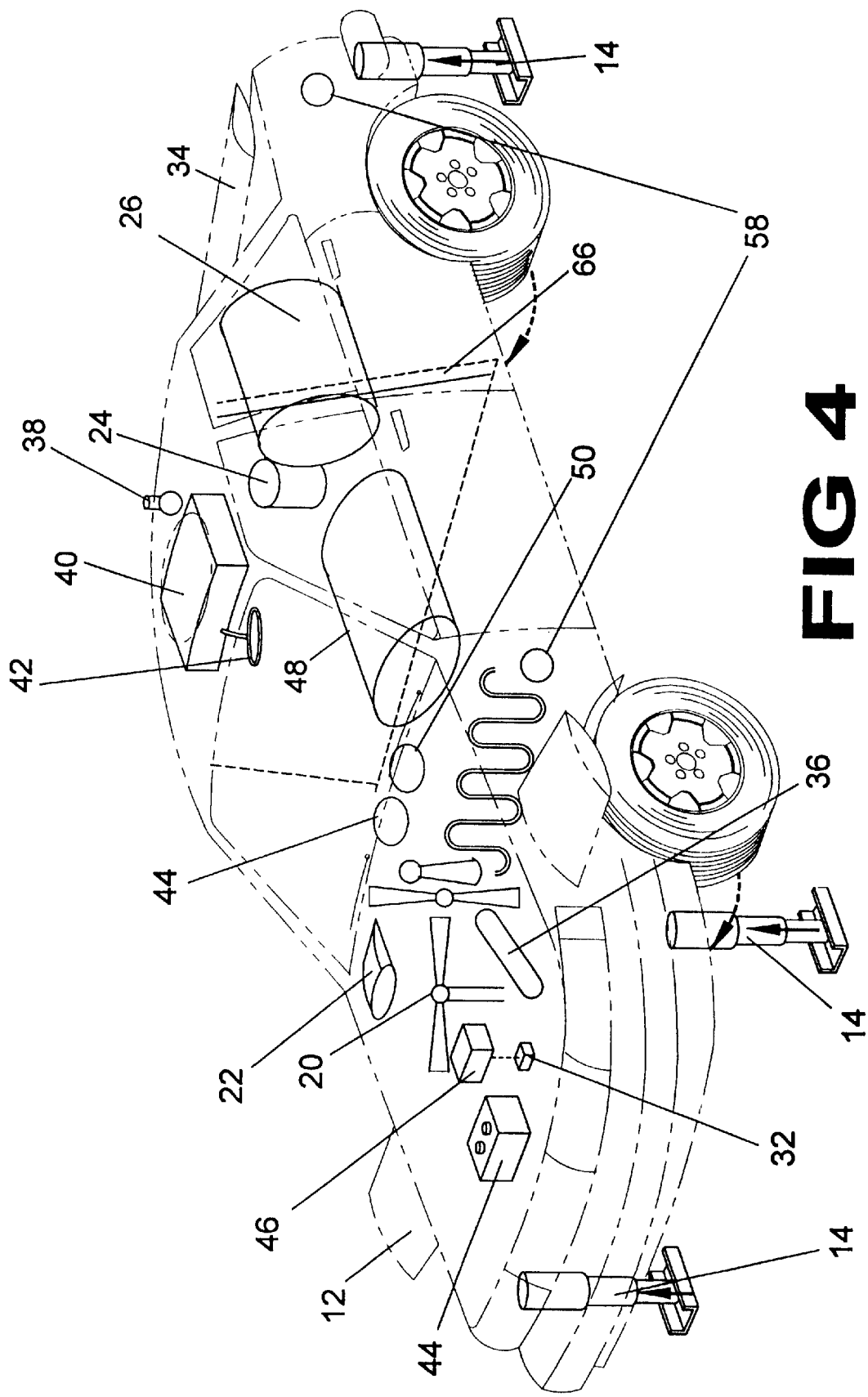
FIG. 4 is a diagrammatic view showing the major components of the present invention with the vehicle body depicted in phantom line.

FIG. 1 shows the vehicle of the present invention 10 being thrust forward by propulsion jetstreams 60 during air travel with stabilization provided conjunctively by retractable ailerons 12, a rear spoiler 34 and stabilizing jetstreams 62, which are controlled by a microprocessor 46 and a gyroscope 32 as illustrated in FIG. 4. The vertical take-off and landing capabilities of the vehicle of the present invention 10 are demonstrated in FIG. 2 as stabilizing jetstreams 62 gently lower the vehicle 10 and hydraulic pumpjacks 14 are deployed as landing gear and support the vehicle 10 during retraction and extraction of the wheels 16 and related wheel well covers 18. The wheel well covers 18 move into place when the wheels 16 retract to form an airtight chassis for improved aerodynamics and hydrodynamics during air and sea travel. The ailerons 12 retract into the vehicle 10 when not being used for air travel. For land travel the wheels 16 are employed and engaged with the axle and the wheel well covers 18 are retracted out of the way and the vehicle of the present invention 10 functions essentially the same as a conventional automobile. The vehicle of the present invention 10 also has at least one rechargeable battery 44 that receives a trickle recharge from a generator 64 as does the motor 20. Potentiometers 70 are installed in-line between the generator 64 and the rechargeable battery 44 and between the generator 64 and the motor 20. The rechargeable battery 44 also provides power to the emergency systems if the motor 20 fails thereby allowing the operator to get the vehicle of the present invention to a safe area.

The primary components of the vehicle of the present invention 10 are illustrated in FIG. 4 including the air compression system having an air intake unit 22 that provides the air that is forced into the air compression tank 26 by the air compression pump 24 where it is then fed to the air propulsion jets 28 and air stabilizing jets 30 as needed. A helium tank 48 is provided to lessen the weight of the vehicle of the present invention 10. A parachute 40 is automatically released if there is a power shut down during air flight and could also be manually deployed by a ripcord 42 located inside the cabin. Another safety feature shown in FIG. 4 is the rollover protection wall 66 that will protect the passengers in the event of a rollover by preventing the roof from being crushed. The cabin temperature is maintained by a climate control unit 68 and pressurized for air and underwater travel and has oxygen pumped in by an oxygen unit 36 and regulated by an oxygen release valve 38. Ideally the oxygen release valve is located centrally at the top of the cabin to prevent the pressure therein from reaching a dangerous level.

Figure 5:
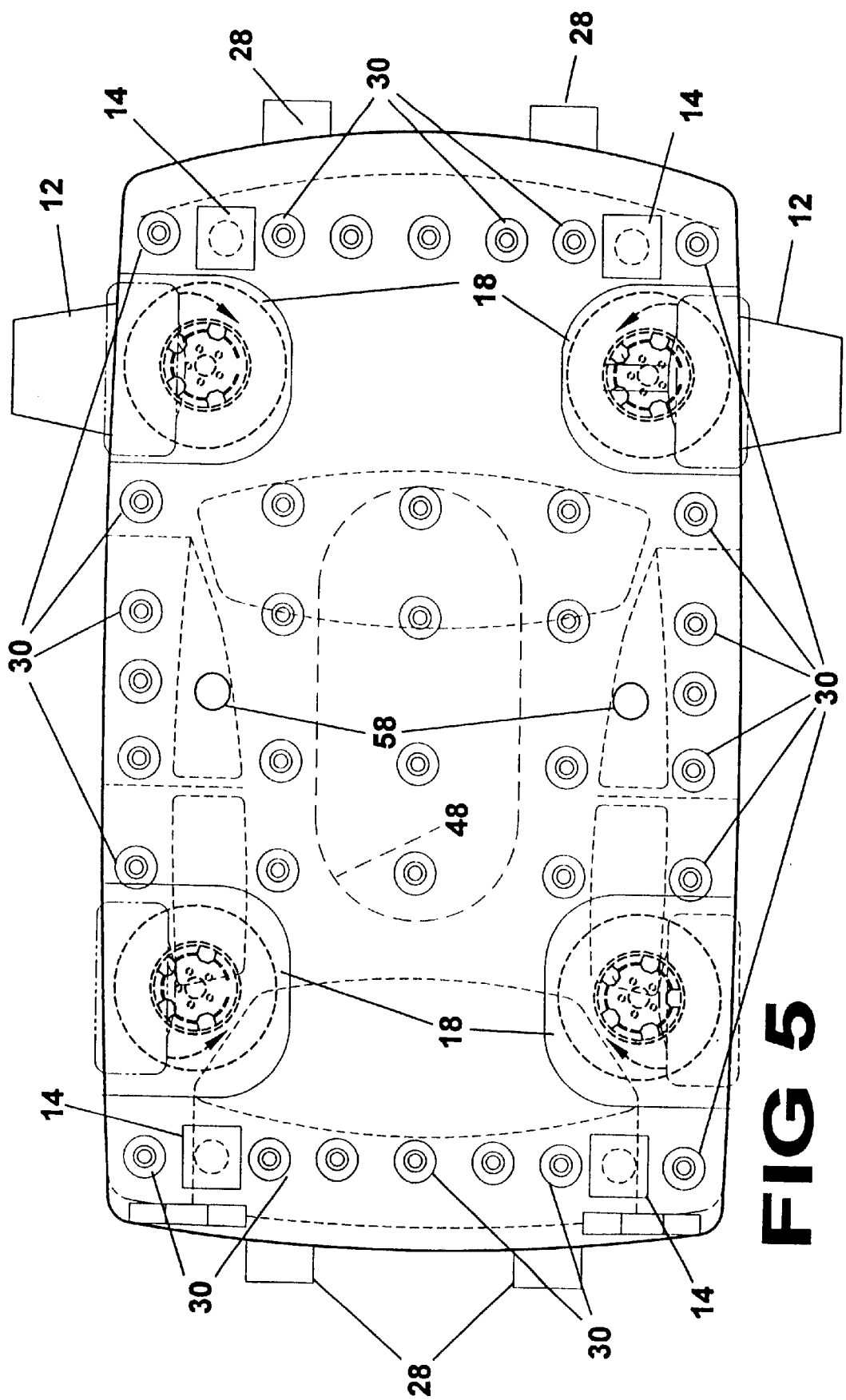
FIG. 5 is a bottom view of the present invention during flight.
Figure 6:
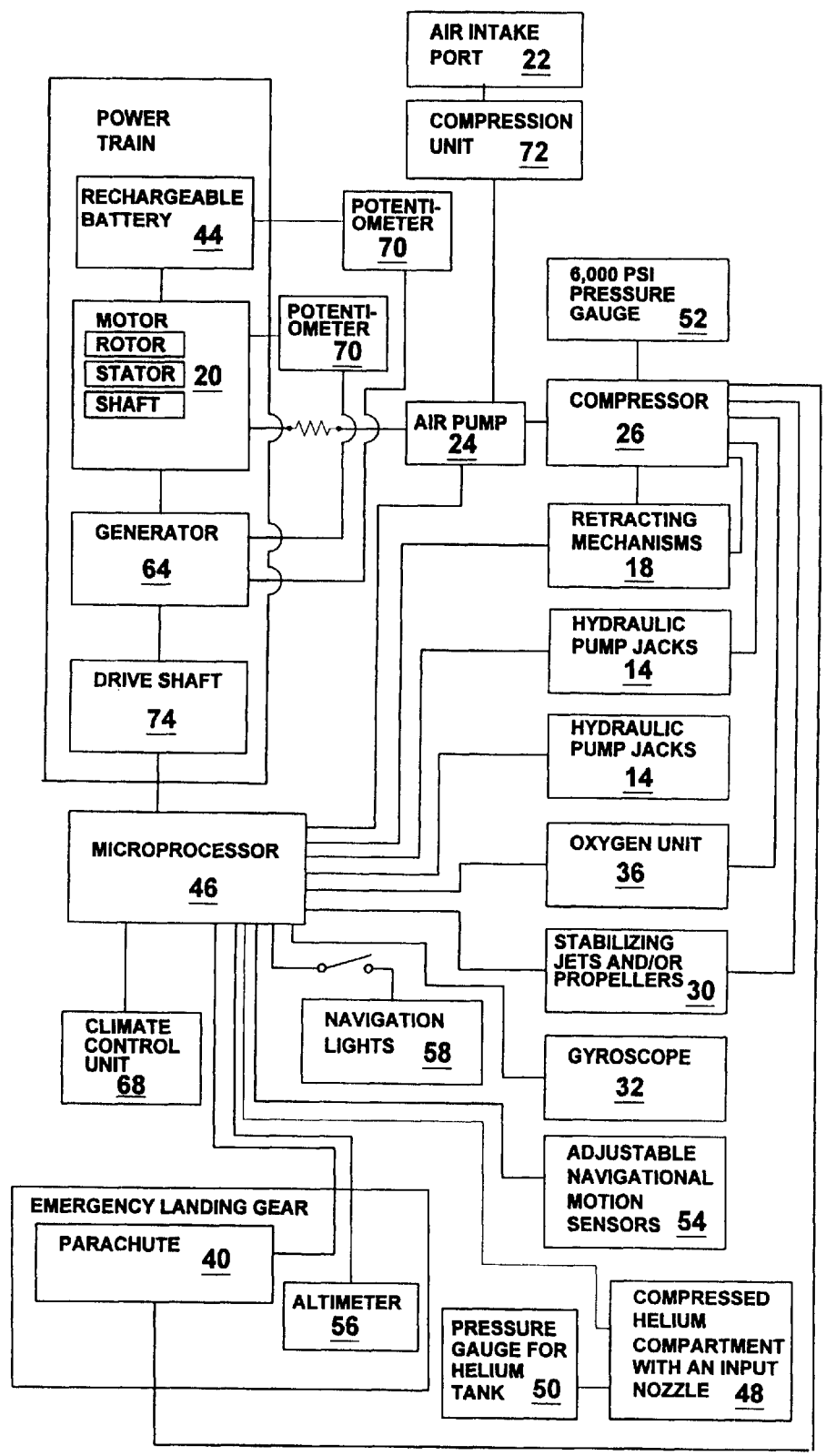
FIG. 6 is a block diagram of the present invention illustrating the relationship of the vital components to one another.
Figure 7:
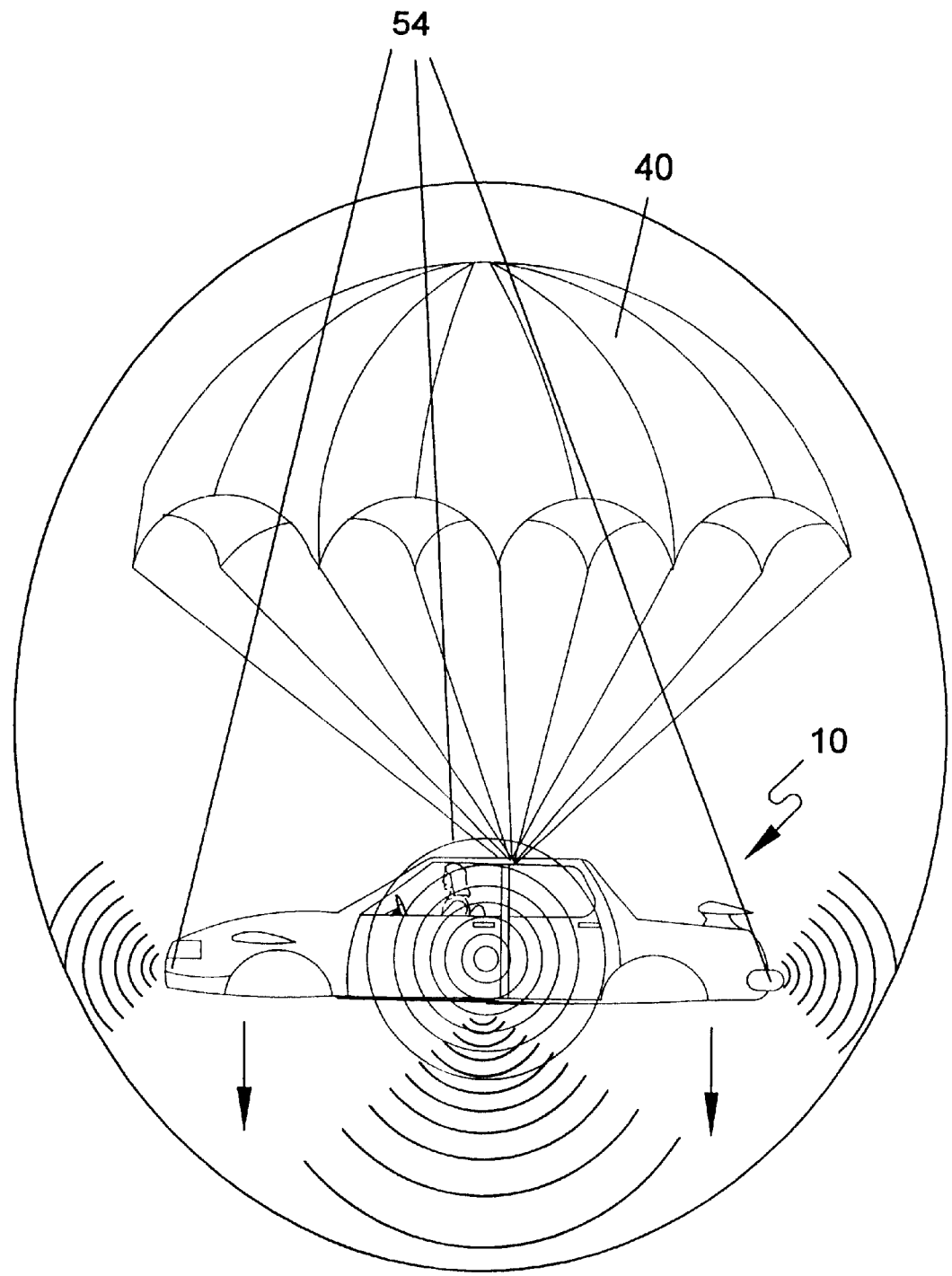
FIG. 7 is a side view of the present invention with the parachute deployed during an emergency landing. Note the sensors emanating from all sides of the vehicle to detect any object that may cause an impact.
Figure 9:
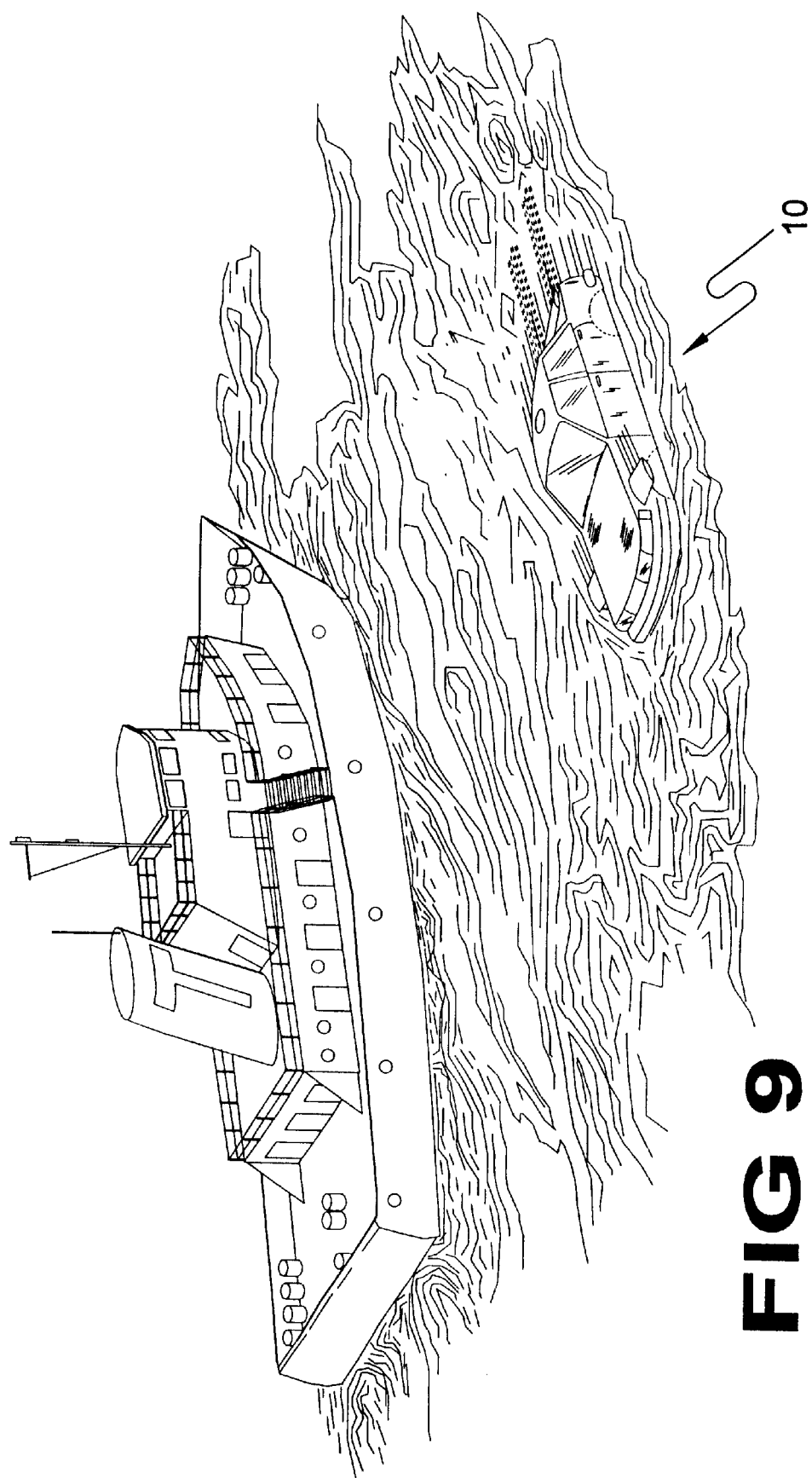
FIG. 9 is a perspective view of the present invention in use as a water transport vessel.
Figure 10:
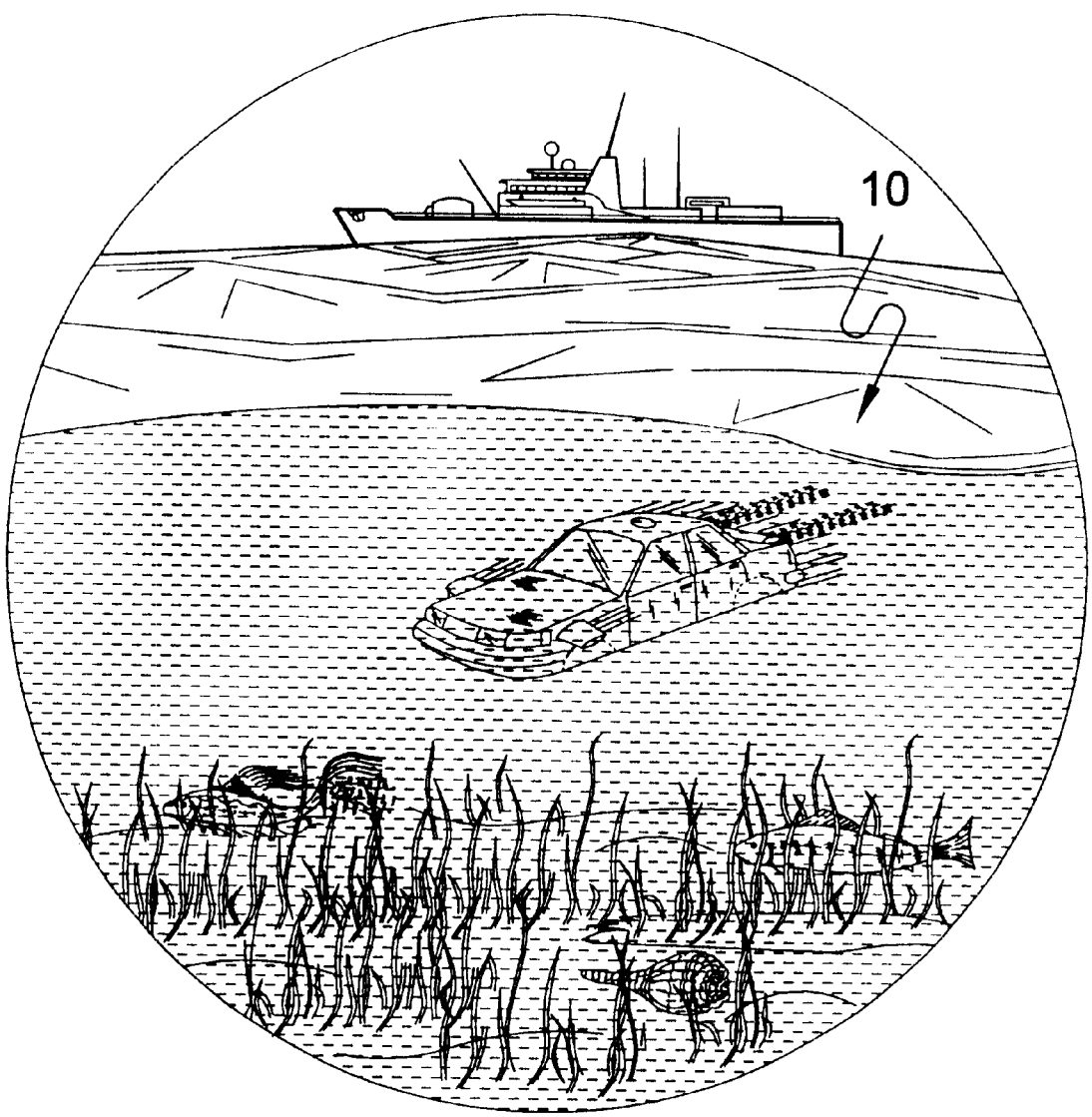
FIG. 10 is a perspective view of the present invention in use as a submersible water transport vessel.

Navigation lights 58 are strategically placed on all sides including the top and bottom of the vehicle of the present invention 10 as is depicted in FIGS. 4 and 5. Any appropriate high intensity light means may be used including but not limited to strobes, beacons, LED's or any combination thereof. Motion sensors 54 are also located on all sides and transmit data to the microprocessor 46 which will initiate the appropriate evasive maneuvers when an imminent collision is detected.

What is claimed is new and desired to be protected by Letters Patent is set forth in the appended claims:

1. A vertical take-off and landing vehicle for land, water and air transport, comprising:
    a) means for propelling and controlling the vehicle on land;
    b) means for propelling and controlling the vehicle on the surface of water;
    c) means for propelling and controlling the vehicle when submerged underwater; and
    means for lifting, propelling and controlling the vehicle through the air, wherein the means for propelling and controlling the vehicle on the surface of water comprises:
    a) a retractable wheel system;
    b) an engine;
    c) a compressed air propulsion system;
    d) a selectively engagable means for communication between said engine and either said retractable wheel system or said compressed air propulsion system;
    e) navigational aids; and
    f) means for controlling the operation of said compressed air propulsion system.

2. The vertical take-off and landing vehicle for land, water and air transport as recited in claim 1, in which the means for propelling and controlling the vehicle on land comprises:
    a) wheels;
    b) an engine;
    c) means for communicating between said wheels and said engine; and
    d) means for controlling the operation of said wheels and engine.

3. A vertical take-off and landing vehicle for land, water and air transport as recited in claim 2, further including a motor; a generator powered by said motor wherein said generator provides an immediate recharge to the motor and to at least one rechargeable battery with the amount of recharge determined by resistors and potentiometers.

4. A vertical take-off and landing vehicle for land, water and air transport as recited in claim 3, further comprising life support systems, wherein said rechargeable battery maintains power to life support systems in the event of a power loss of the primary power source.

5. The vertical take-off and landing vehicle for land, water and air transport as recited in claim 1, in which the compressed air propulsion system comprises:

a) an air intake means;
b) an air compression pump;
c) an air compression tank; and
d) jet nozzles.

6. A vertical take-off and landing vehicle for land, water and air transport as recited in claim 5, in which the jet nozzles of the compressed air propulsion system are located on the underside of the vehicle for vertical lift.

7. A vertical take-off and landing vehicle for land, water and air transport as recited in claim 5, which the jet nozzles of the compressed air propulsion system are located on the rear of the vehicle for propulsion.

8. A vertical take-off and landing vehicle for land, water and air transport as recited claim 5, in which the jet nozzles of the compressed air propulsion system are located on the sides of the vehicle for lateral movement.

9. A vertical take-off and landing vehicle for land, water and air transport as recited in claim 5, in which the jet nozzles of the compressed air propulsion system are located on the front of vehicle for braking and reverse travel when applicable.

10. The vertical take-off and landing vehicle for land, water and air transport as recited in claim 1, in which the compressed air propulsion system comprises:
a) an air intake means;
b) an air compression pump;
c) an air compression tank;
d) jet nozzles.

11. The vertical take-off and landing vehicle for land, water and air transport as recited in claim 1, in which the retractable wheel system comprises:
a) retractable wheels;
b) retractable wheel well covers; and
c) hydraulic pump jacks.

12. The vertical take-off and landing vehicle for land, water and air transport as recited in claim 11, in which a preferred number of hydraulic pump jacks is four and all hydraulic pump jacks are simultaneously extendable for retraction and extraction of said retractable wheels.

13. The vertical take-off and landing vehicle for land, water and air transport as recited in claim 1, further comprising a pressurized cabin comprising:
a) a hermetically sealed cabin area;
b) a compression unit;
c) an oxygen unit; and
d) an oxygen release valve.

14. A vertical take-off and landing vehicle for land, water and air transport as recited in claim 1, in which the retractable wheel system comprises:
a) wheels;
b) wheel wells in which said wheels are positioned;
c) means for retracting said wheels;
d) means for hermetically sealing the wheel wells; and
e) means for lifting said vehicle off of the ground to allow for retraction of said wheels.

15. A vertical take-off and landing vehicle for land, water and air transport as recited in claim 14, in which the wheel retracting means comprises:
a) means for selectively engaging and disengaging said wheels from the axle; and
b) means for moving said wheels from a substantially vertical position to a substantially horizontal position and back.

16. A vertical take-off and landing vehicle for land, water and air transport as recited in claim 14, in which the means for hermetically sealing the wheel wells are wheel well covers that are deployed during retraction and slide and lock into place in an airtight and watertight manner so as to increase the aerodynamic and hydrodynamic properties of the vehicle and to protect internal components such as the wheel braking system when used for water-based transportation.

17. A vertical take-off and landing vehicle for land, water and air transport as recited in claim 14, in which said means for lifting said vehicle are hydraulic lifts that are individually deployed by the operator for selectively lifting a portion of said vehicle.

18. A vertical take-off and landing vehicle for land, water and air transport as recited in claim 2, further comprising a parachute, wherein said hydraulic lifts are selectively pressurized by the operator to provide a spring-like suspension and soften the landing during vertical landings including emergency landings using the parachute.

19. A vertical take-off and landing vehicle for land, water and air transport as recited in claim 14, wherein said means for lifting said vehicle are hydraulic jacks for use as landing gear during vertical take-offs and landings.

20. A vertical take-off and landing vehicle for land, water and air transport, comprising:
a) means for propelling and controlling the vehicle on land;
d) means for propelling and controlling the vehicle on the surface of water;
e) means for propelling and controlling the vehicle when submerged underwater; and
f) means for lifting, propelling and controlling the vehicle through the air, in which the means for propelling and controlling the vehicle when submerged underwater comprises:
a) retractable wheel system;
b) a compressed air propulsion system;
c) a pressurized cabin;
d) an engine;
e) means for communication between said compressed air propulsion system and said engine; and
f) means for controlling the operation of said compressed air propulsion system.

21. A vertical take-off and landing vehicle for land, water and air transport as recited in claim 20, further including a stabilizing and navigational system comprising:
a) an altimeter;
b) a gyroscope;
c) a microprocessor;
d) motion detectors; and
e) navigation lights.

22. A vertical take-off and landing vehicle for land, water and air transport as recited in claim 21, wherein the navigation lights include a high intensity lighting means.

23. A vertical take-off and landing vehicle for land, water and air transport as recited in claim 21, in which the motion detectors of the stabilizing and navigational system utilize a combination of radar and sonar to detect the presence of an Object in the vicinity thereof that might present a threat to the vehicle of the present invention.

24. A vertical take-off and landing vehicle for land, water and air transport as recited in claim 21, in which the motion detectors of the stabilizing and navigational system are situated to provide full 360 degree coverage.

25. A vertical take-off and landing vehicle for land, water and air transport as recited in claim 21, in which the motion detectors of the stabilizing and navigational system transmit data to said microprocessor which then takes appropriate evasive action when notified of a potential hazard approaching or being approached by said vehicle of the present invention.

26. A vertical take-off and landing vehicle for land, water and air transport as recited in claim 21, in which the motion detectors of the stabilizing and navigational system are selectively adjustable by the operator to determine the range being scanned for potential dangerous objects.

27. A vertical take-off and landing vehicle for land, water and air transport, comprising:
   a) means for propelling and controlling the vehicle on land;
   g) means for propelling and controlling the vehicle on the surface of water;
   h) means for propelling and controlling the vehicle when submerged underwater; and
   i) means for lifting, propelling and controlling the vehicle through the air, in which the means for propelling and controlling the vehicle through the air comprises:
      a) a retractable wheel system;
      b) retractable ailerons;
      c) a compressed air propulsion system;
      d) a pressurized cabin;
      e) an engine;
      f) means for communication between said compressed air propulsion system and said engine; and
      g) means for controlling the operation of said compressed air propulsion system.

28. A vertical take-off and landing vehicle for land, water and air transport as recited in claim 27, further including at least one sealed compartment about the undercarriage of said vehicle filled with helium or another bouyant substance having an input nozzle integral with each sealed compartment allowing for the additional input of said gravitational substance therein and further having a helium pressure gauge inside the cabin to monitor the pressure within said compartment.

* * * * *